Feb. 23, 1937.  W. A. HEINZE  2,071,403

ARMORED GREASE RETAINER WITH WASHER AND SPACER

Original Filed April 9, 1934

William A. Heinze
INVENTOR

PER  Albert J. Fihe
ATTORNEY

Patented Feb. 23, 1937

2,071,403

UNITED STATES PATENT OFFICE 2,071,403

ARMORED GREASE RETAINER WITH WASHER AND SPACER

William A. Heinze, Chicago, Ill., assignor to Victor Manufacturing & Gasket Company, Chicago, Ill., a corporation of Illinois Original application April 9, 1934, Serial No. 719,677. Divided and this application May 17, 1935, Serial No. 22,045

7 Claims. (Cl. 288—1)

This invention relates to an improved grease retainer, and has for one of its principal objects the provision of a device for retaining oil or grease in the bearings of rotating shafts, and which includes a flexible packing element mounted in the retainer.

This application constitutes a division of applicant's original application for patent on "Armored grease retainer with washer and spacer", filed April 9, 1934, Serial No. 719,677.

One of the important objects of this invention is the provision of a novel holding and armoring means for packing material which shall provide better contact with the rotatable element, thereby eliminating possibilities of leakage.

Another important object of the invention is the provision in a grease retainer of an armored packing of leather or the like which, on account of its construction, shall provide a better resistance to blows or other extraneous forces directed against a grease retainer, particularly in efforts to place the same in position.

A still further important object of the invention is to provide, in an armored packing for grease retainers, means whereby the packing itself will be constrained into a shape more nearly approximating a right-angle, one leg of which shall be perpendicular to the rotating shaft and the other leg approximately parallel thereto.

Another and still further important object is the provision in a grease retainer of means for holding the leather or other flexible packing in closed relationship with the shaft or other rotatable element whereby possibility of leakage is definitely overcome.

A still further object is the construction of a novel packing element for use in grease retainers of this type wherein a saving of approximately half of the original amount of leather heretofore thought necessary is accomplished.

Other and further important objects of the invention will be apparent from the disclosures in the accompanying drawing and following specification.

The invention, in a preferred form, is illustrated in the drawing and hereinafter more fully described.

Figure 1:
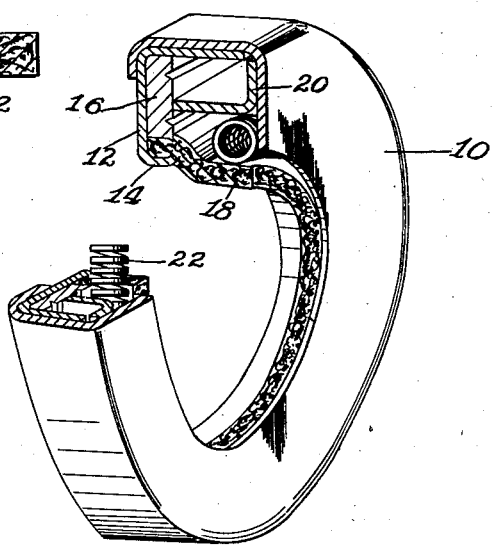
Figure 1 is a perspective view of one of the improved grease retainers of this invention, parts being cut away to show the interior construction.

The reference numeral 10 indicates generally a casing for one of the improved grease retainers of this invention, the same preferably embodying an annular sheet metal cup-like element having the usual opening therethrough for the passage of a rotatable shaft about which the grease retainer is adapted to be mounted.

Slidably fitted into the outer casing 10 is an inner casing 12 which is approximately L-shaped in cross-section as best shown in Figure 1 and has an inwardly bent inner edge 14, which edge, together with a relatively thick metal washer 16, acts to clamp the offset annular rim of a packing element 18 which is preferably of leather or some similar flexible material. It will be noted that the in-turned edge 14 of the element 12 closely grips the edge of the leather packing against the inner periphery of the washer 16, which is seated against the inner side face of the shell 12.

A spacing member 20 which may be laminated, if desired, is positioned between the casings 10 and 12, and is preferably L-shaped as shown, with one leg thereof bearing against the inner face of the cup-shaped element 10 and the edge of the other leg bearing against the metal washer 16. This provides a reinforcement against distortion due to blows or other force which might be used in placing the retainer in desired position, and further assures a proper operating space for a garter spring or the like 22 which is positioned in annular relationship with the inner offset face of the packing element 18. In this manner, a satisfactory surface contact between the packing element 18 and the rotating shaft is provided and undesirable leakage avoided.

Figure 2:
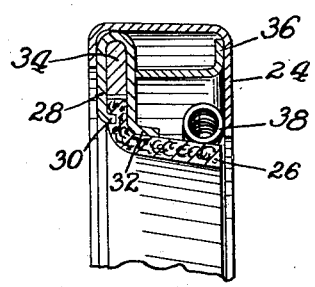
Figure 2 is a modified form of Figure 1, illustrating a more definite embodiment of the armored feature.

In Figure 2 is shown a modification of the invention wherein an outer shell 24 is provided, and into this shell is fitted a combination armor and clamping element for the packing 26 which clamping element comprises a sheet metal annular structure 28, preferably U-shaped in cross-section as shown in Figure 2, one of the legs of which is shorter than the other and is turned inwardly as shown at 30 to provide a suitable clamping engagement with the in-turned end of the leather packing 26.

The longer leg of the U-shaped element 28 is also turned inwardly as illustrated at 32 to provide a practically right-angle bend which assists in shaping a correspondingly right-angle bend in the leather or other packing 26, and furthermore, acts to positively force the leather packing into quite an extensive surface contact with the rotating shaft about which the retainer is positioned.

A relatively heavy metal washer 34 is inserted into the outer or upper end of the U-shaped structure 28 whereby a suitable spacing of the leather packing is accomplished and an additional reinforcement against blows or other stresses and strains is provided.

A spacing element 36 is inserted between the outer shell 24 and the inner face of the combination armor and reinforcement, and the usual garter spring 38 is also employed.

Figure 3:
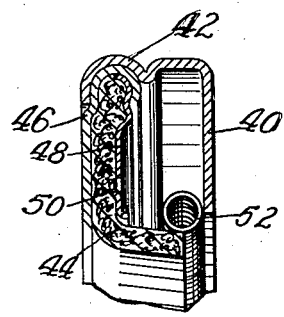
Figure 3 shows a still further modification and a completely armored packing.

In Figure 3 is illustrated another modification of the invention wherein an outer shell 40 is provided which is beaded as shown at 42 to provide a suitable stop and retaining means for an armored packing element which consists of the usual leather 44, this, in turn, being mounted in a combination of a fairly heavy sheet metal outer case 46 and a relatively thin sheet metal inner case 48. The relatively thin sheet metal inner case is shaped and compressed against the inner face of the leather, and has its outer periphery inclosed by the in-turned inner end of the heavier sheet metal element 46, all as best shown in Figure 3.

Inwardly struck lugs or tangs 50 are formed in the relatively thin inner metal sheath 48 so as to securely hold the leather in position and also prevent undesirable turning thereof while the shaft is rotating. A garter spring 52 is provided as is common in constructions of this type. In this instance, no further reinforcing or spacing element is necessary, as the armored leather provides sufficient resistance against outside forces, and the annular beaded stop 42, together with the in-turned edge of the casing 40, suitably positions the packing and its armor in desired relationship to the casing. It will be noted that all of the casings have their ends in-turned about the holder for the packing so as to comprise a unitary structure.

Figure 4:
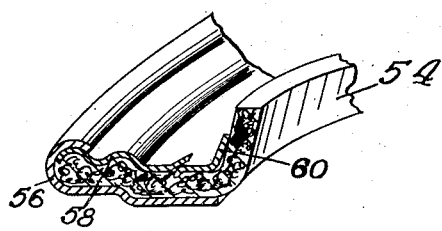
Figure 4 is a perspective view of the armored packing shown as a part of the structure of Figure 3 and illustrating a further slight modification.

In Figure 4 is shown a modification of the armored packing illustrated in Figure 3 wherein there is provided a shaped leather or other flexible element 54 mounted in an outer sheath or the like 56 of relatively heavy metal and a corresponding inner sheath 58 of thinner metal, this inner sheath, however, having its inner periphery 60 turned at approximately a right-angle and thereby adapted to bear against the correspondingly turned portion of the leather packing 54. The action of this is somewhat similar to the action of the part 32 shown in Figure 2. These inwardly turned ledges may be made in the shape of spaced fingers rather than a continuous ledge or lip, if desired.

Figure 5:
Figure 5 is a sectional view of an improved type of packing adapted to be used in conjunction with grease retainers of this type.
Figure 6:
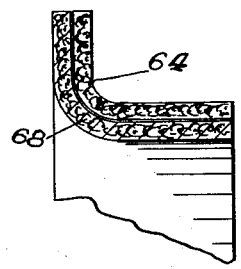
Figure 6 shows a packing similar to that illustrated in Figure 5, embodying a slight modification.

In Figures 5 and 6, there are shown embodiments of a combination packing element wherein only half, namely that shown at 62 and 68 respectively may be of some other flexible material cheaper than leather, as, for example, heavy paper, a leather substitute, impregnated cloth or anything which will answer the purpose.

The preferable method of joining the leather to its companion piece is either by stitching, for which purpose heavy thread or light wire may be used, or by simply gluing as illustrated by the line 72 in Figure 6. The joint is preferably made beveled as shown in Figures 5 and 6 so as to allow of a better bending at the required line or of a simple offsetting as embodied in the structure shown in Figure 1. The saving of leather in such a structure amounts to considerable, and inasmuch as the portions 66 and 68 are not subjected to wear, and are impregnated or otherwise treated so as to be grease proof, the actual operating result is the same in either instance, and a satisfactory construction is produced.

It will be seen that herein is provided a novel and useful type of grease retainer which, for simplicity of construction and essential strength combined with lightness and necessary leak-proof elements is highly satisfactory. The manufacture and assembly of the various parts is also comparatively simple, thereby providing a more satisfactory construction from the purchaser's viewpoint, while the use of combinations of leather with other elements for the packing itself produces a considerable saving.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A grease retainer, comprising an outer shell having one side wall, an inner shell fitted into the outer shell, and with one face forming another side wall of the retainer and a flexible packing element, said inner shell comprising an armored support for the packing element, said packing element being L-shaped in cross-section and with one leg clamped and supported by the inner shell, said inner shell being U-shaped in cross-section with one leg embedded into adjacent portions of the packing element, and a relatively heavy metal washer inserted in said U-shaped shell with its inner periphery substantially contacting the adjacent outer periphery of the packing.

2. A grease retainer, comprising an outer shell having one side wall, an inner shell fitted into the outer shell, and with one face forming another side wall of the retainer and a flexible packing element, said inner shell comprising an armored support for the packing element, said packing element being L-shaped in cross-section and with one leg clamped and supported by the inner shell, said inner shell being U-shaped in cross-section with one leg embedded into adjacent portions of the packing element, and a relatively heavy metal washer inserted in said U-shaped shell with its inner periphery substantially contacting the adjacent outer periphery of the packing, the other leg of the U-shaped shell being likewise bent inwardly to correspond to the shape of the packing and acting against the corresponding bent portion of the packing.

3. A grease retainer, comprising an outer shell having one side wall, an inner shell fitted into the outer shell, and with one face forming another side wall of the retainer and a flexible packing element, said inner shell comprising an armored support for the packing element, said packing element being L-shaped in cross-section and with one leg clamped and supported by the inner shell, said inner shell being U-shaped in cross-section with one leg embedded into adjacent portions of the packing element, and a relatively heavy metal washer inserted in said U-shaped shell with its inner periphery substantially contacting the adjacent outer periphery of the packing, the other leg of the U-shaped shell being likewise bent inwardly to correspond to the shape of the packing and acting against the corresponding bent portion of the packing, and a spacing member between the shells contacting each of same.

4. A grease retainer, comprising an outer shell having one side wall, an inner shell fitted into the outer shell, and with one face forming another side wall of the retainer and a flexible packing element, said inner shell comprising an armored support for the packing element, said packing element being L-shaped in cross-section and with one leg clamped and supported by the inner shell, said inner shell being U-shaped in cross-section with one leg embedded into adjacent portions of the packing element, and a relatively heavy metal washer inserted in said U-shaped shell with its inner periphery substantially contacting the adjacent outer periphery of the packing, the other leg of the U-shaped shell being likewise bent inwardly to correspond to the shape of the packing and acting against the corresponding bent portion of the packing, and a spacing member between the shells contacting each of same, together with a garter spring positioned in the space provided by the spacing member and acting against that portion of the packing beyond the in-turned leg of the U-shaped clamping element.

5. A grease retainer, comprising an outer cup-like shell, a flexible packing in the shell, said packing including a sleeve-like portion for engaging a shaft, and a flat peripheral portion integral with the sleeve-like portion, and holding means for the packing mounted on said peripheral portion, said holding means comprising a flat washer positioned in the plane of the said flat peripheral portion and with its inner rim substantially contacting the outer rim of the packing and an armor over the washer and contacting both faces of the packing periphery.

6. A grease retainer, comprising an outer cup-like shell, a flexible packing in the shell, said packing including a sleeve-like portion for engaging a shaft, and a flat peripheral portion integral with the sleeve-like portion, and holding means for the packing mounted on said peripheral portion, said holding means comprising a flat washer positioned in the plane of the said flat peripheral portion and with its inner rim substantially contacting the outer rim of the packing and an armor over the washer and contacting both faces of the packing periphery, together with a spacer in the outer shell acting against the armor.

7. A grease retainer, comprising an outer cup-like shell, a flexible packing in the shell, said packing including a sleeve-like portion for engaging a shaft, and a flat peripheral portion integral with the sleeve-like portion, and holding means for the packing mounted on said peripheral portion, said holding means comprising a flat washer positioned in the plane of the said flat peripheral portion and with its inner rim substantially contacting the outer rim of the packing and an armor over the washer and contacting both faces of the packing periphery, and an inturned edge on said armor acting against the angle between the sleeve-like part of the packing and its periphery.

WILLIAM A. HEINZE.